May 26, 1925.
R. J. DAVIS
1,539,721
DEMOUNTABLE WHEEL TREAD
Filed May 8, 1924
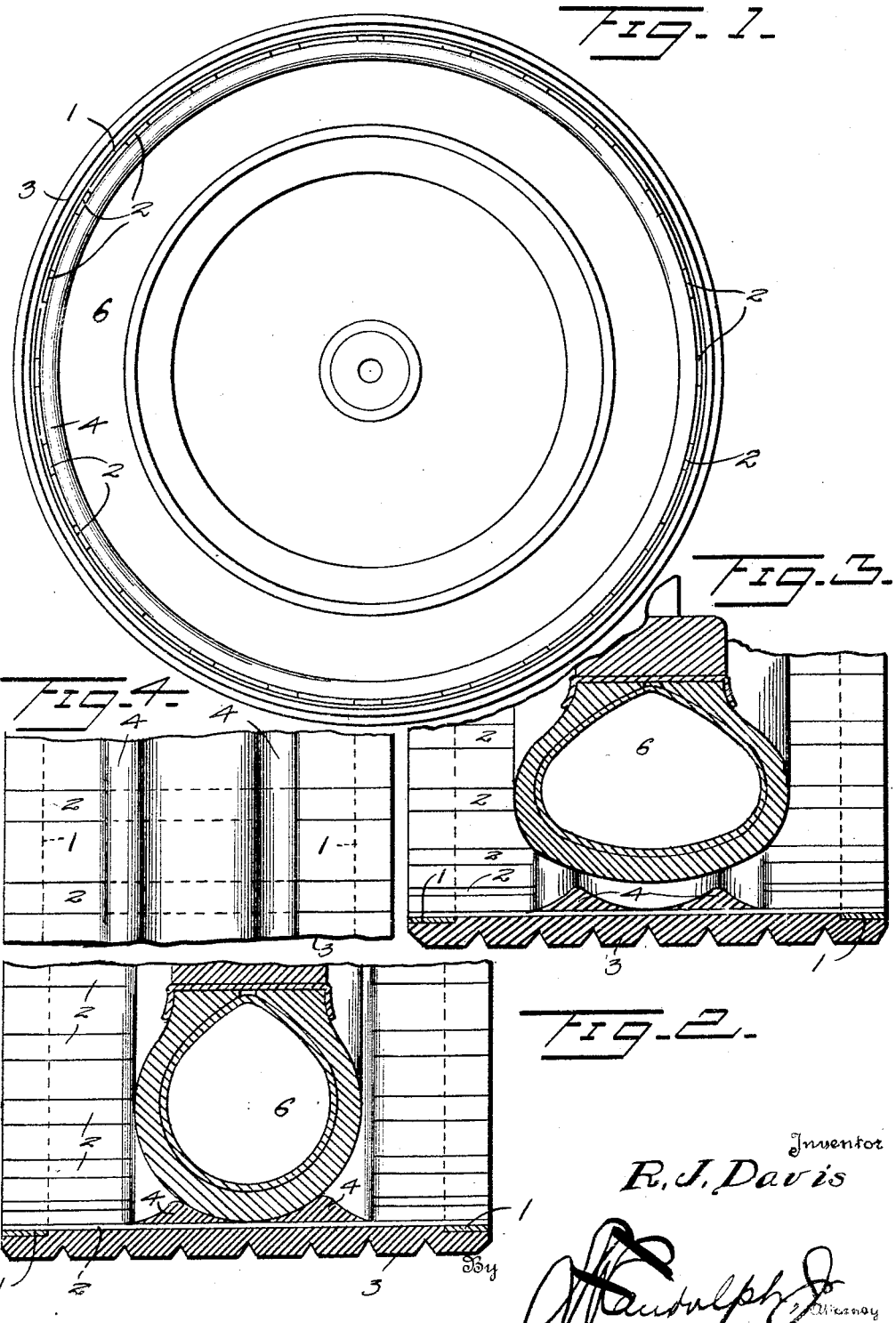
Inventor
R. J. Davis Patented May 26, 1925.

1,539,721

UNITED STATES PATENT OFFICE.

ROBERT J. DAVIS, OF BARNES, WISCONSIN.

DEMOUNTABLE WHEEL TREAD.

Application filed May 8, 1924. Serial No. 711,871.

*To all whom it may concern:*

Be it known that I, ROBERT J. DAVIS, a citizen of the United States, residing at Barnes, in the county of Bayfield and State of Wisconsin, have invented certain new and useful Improvements in Demountable Wheel Treads; and I do hereby declare the following to be a full, clear, and exact description of the invention, such as will enable others skilled in the art to which it appertains to make and use the same.

The invention provides an attachment whereby a motor vehicle may travel over snow covered surfaces and sandy and soft roads with safety and without stalling, the attachment providing a broad tread and of such construction as to be manufactured cheaply and easily placed in position or removed as required.

Other objects and advantages will be apparent and suggest themselves as the nature of the invention is understood.

While the drawings illustrate an embodiment of the invention it is to be understood that in adapting the same to meet different conditions and requirements, various changes in the form, proportions and minor details of construction may be resorted to without departing from the spirit of the invention.

Referring to the accompanying drawings forming a part of the application:

Figure 1 is a side elevation of a demountable wheel tread embodying the invention, Figure 2 is a sectional view showing the invention applied, Figure 3 is a view similar to Figure 2, the pneumatic tire being deflated whereby to admit of placing the tread in position or removing it from the vehicle wheel, and Figure 4 is a detail plan view of a portion of the device.

Corresponding and like parts are referred to in the following description and designated in the several views of the drawings by like reference characters.

The attachment comprises two flat rings 1 which are spaced apart and connected by flat cross strips 2. This results in the formation of a tread band which may be of any width and diameter. A rubber tread 3 is applied to the outer side of each of cross strips 2 and may be held in place by rivets or other fastening means. Confining rings 4 preferably of rubber are applied to the inner side of the band and are disposed upon opposite sides of a medial plane and are secured to the cross pieces 2 in any preferred way. These confining rings are so formed and arranged as to receive the pneumatic tire 6 of the wheel between them. This results in the formation of a channel in which the tire 6 is seated, thereby preventing lateral displacement of the attachment.

The attachment materially increases the tread of the vehicle wheel so that it will not sink in snow, mud or sand thereby forming a support to sustain the vehicle when traveling over snow, mud or sand. The tread is continuous and of a diameter to slip readily on or off from a vehicle wheel when the pneumatic tire 6 is deflated, as indicated most clearly in Figure 3. After the attachment has been placed in position, the tire 6 is inflated and obtains a snug fit upon the inner or channeled side of the tread, as indicated in Figure 2, thereby holding the same in place.

What is claimed is:

1. A demountable wheel tread comprising spaced rings, crosspieces connecting the rings, a rubber tread covering the outer side of the band, and confining rings upon the inner side of the band and upon opposite sides of a medial plane and having their inner faces formed to provide a channel to receive a pneumatic tire.

2. A demountable wheel tread, comprising spaced flat rings, crosspieces connecting the rings, rubber on the outer faces of the crosspieces, and spaced confining rings of rubber attached to the inner faces of the crosspieces and forming a channel to receive a pneumatic tire between them.

In testimony whereof I affix my signature in presence of two witnesses.

ROBERT J. DAVIS.

Witnesses:
L. D. PEASE,
FRANK J. CLOCK.